May 22, 1945.  A. D. WILLIAMS  2,376,565
INJECTOR VALVES
Filed March 27, 1942  2 Sheets-Sheet 2
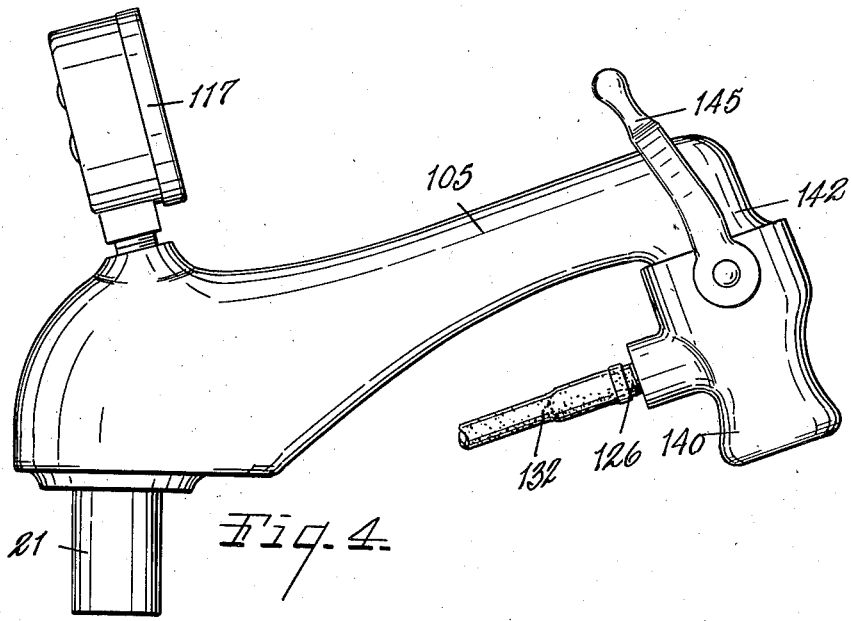
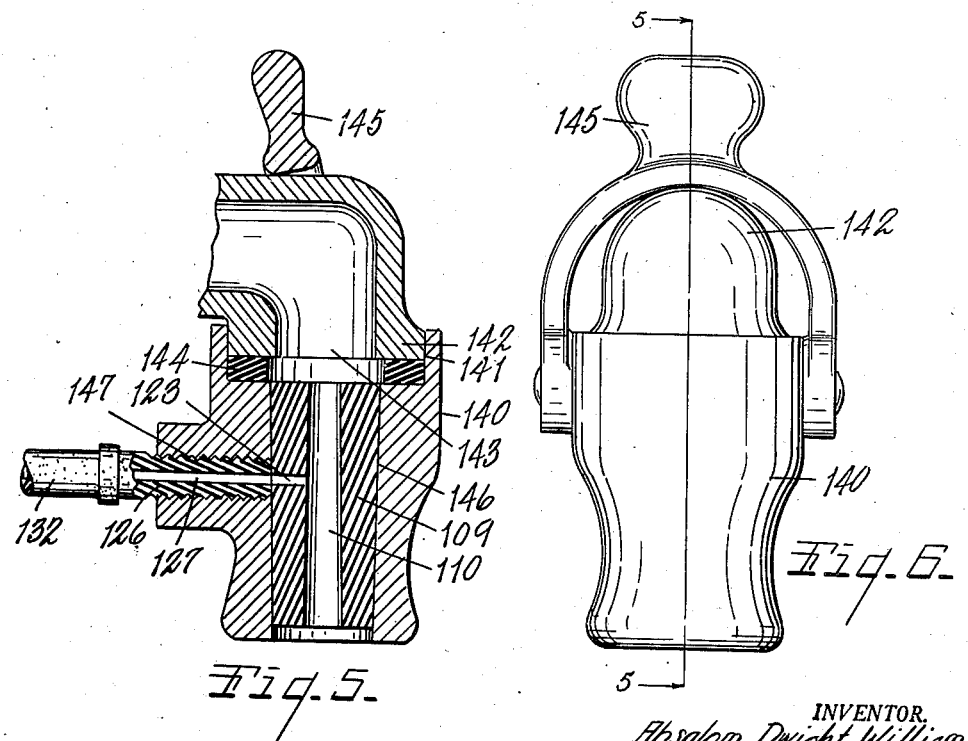
INVENTOR.
Absalom Dwight Williams
BY Earl + Chappell Patented May 22, 1945

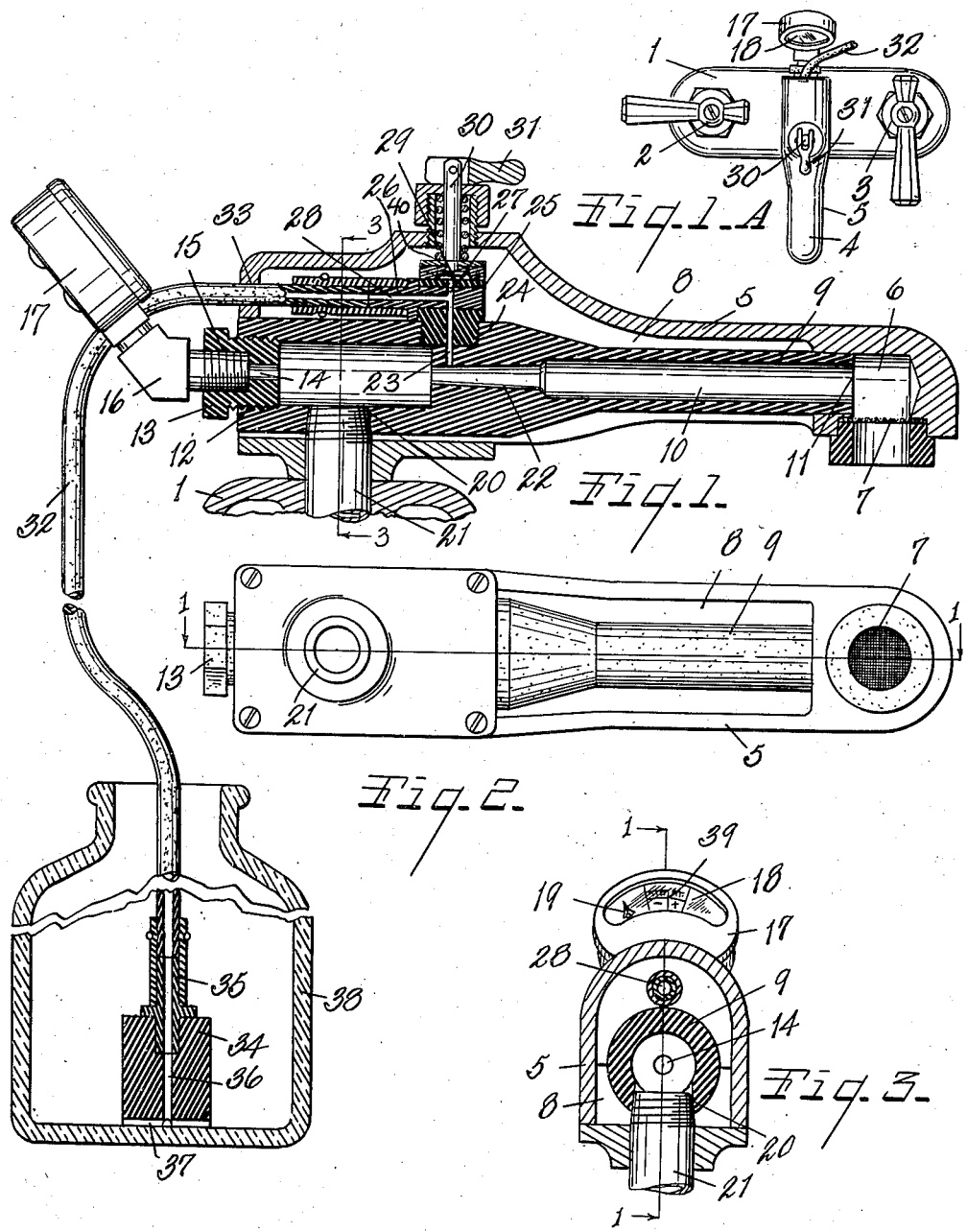

2,376,565

UNITED STATES PATENT OFFICE 2,376,565

INJECTOR VALVE

Absalom Dwight Williams, South Haven, Mich., assignor of fifty-five one-hundredths to Everett R. Brewer, Chicago, Ill.

Application March 27, 1942, Serial No. 436,468

1 Claim. (Cl. 299—84)

This invention relates to improvements in injector valves.

This invention relates to injector valves for mixing some liquid such as a disinfectant such as chlorine or water softening solution with water or some other liquid. It has for its objects:

First, to provide a new and improved device of the class described.

Second, to provide such a device in which the amount of the disinfectant or the like which is mixed with the water may be easily controlled.

Third, to provide such a device in which the corrosive action of the disinfectant, if it is chlorine or a similar substance, is reduced to a minimum.

Fourth, to provide such a device which is inexpensive and may be easily used and adapted to any dish-washing equipment for a bar or restaurant.

Other objects and advantages pertaining to details and economies of construction and operation will appear from the description to follow. Preferred embodiments of my invention are illustrated in the accompanying drawings, in which:

Fig. 1 is a detail sectional view through a faucet embodying my invention, taken on the line 1—1 of Figs. 2 and 3.

Fig. 1A is a top view of such a valve.

Fig. 2 is a bottom view of such a faucet.

Fig. 3 is a detail sectional view taken on line 3—3 of Fig. 1.

Fig. 4 is a side elevational view of a nozzle showing a modified form of my invention.

Fig. 5 is a detail sectional view taken on line 5—5 of Fig. 6 through the form of invention shown in Fig. 4.

Fig. 6 is a view taken from the right hand of Fig. 4.

My invention may be incorporated in a standard faucet for use at a sink. Such a faucet is shown at 1 consisting of valves 2 and 3 for controlling hot water which flows from the valves through suitable passages, (which are not shown in detail since they are conventional), to and through the nozzle 4 of the faucet. The nozzle 4 consists of a shell or casing 5 which is preferably of metal. This shell has an outlet 6 on which is shown a suitable non-splash screen 7. A chamber 8 is provided in the shell and located in the chamber is a corrosion resistant member 9 which is preferably formed of hard rubber. The corrosion resistant member has a through bore 10 having one end 11 adjacent the outlet 6 of the nozzle 4. The other end 12 of the bore 10 is enlarged and screw threaded to receive a screw threaded plug 13 which is also preferably of hard rubber and which is provided with a bore 14 therethrough which is enlarged at 15 and screw threaded to receive the screw threaded base 16 of a pressure gage 17 which has a dial 18 and a pointer 19.

Adjacent the end 12 of the bore 10 is a cross bore 20 opening into the bore 10 to receive water through a pipe 21 which connects with the valves 2 and 3. Between the cross bore 20 and the end 11 of the bore 10 is a flared portion 22 flaring toward the outlet end 11 of the bore 10. A cross bore 23 opens into the flared portion 22 of the bore 10. This cross bore 23 is enlarged at its upper end to receive a stopper member 24 provided through its upper portion with a horizontally disposed passage in which is mounted a hard rubber nipple 26 closed at one end 25 and provided with a longitudinal bore 28 extending inwardly from its opposite end. A bore 27, alined with the reduced lower portion of the cross bore 23, extends vertically through the lower wall of the stopper 24, the nipple 26 and then through the upper wall of the stopper directly to the outside atmosphere. The inner end of the bore 28 of the nipple intercepts the vertical bore 27. A valve 40 secured by the head 29 to the lower end of the stem 30 and actuated by said stem and handle 31 closes the end of the bore 27, which serves as a vent to break the siphon through the bore 28, when the device is in use. When the valve 40 is in the open position by operation of the handle 31 to a vertical position, no disinfectant or the like is mixed with the water flowing through the bore 10. When the valve is closed as shown in Fig. 1, the siphon action takes place. A flexible rubber tube 32 extends through an aperture 33 in the casing and is suitably attached to the nipple 26. At its other end it is provided with a hard rubber member 34 which has a nipple 35 for connection to the tube 32 and a through bore 36 opening to a cross passage 37 at the bottom thereof. This member is placed in the bottom of a suitable reservoir 38 which is here shown as a glass jar in which chlorine water or other liquid disinfectant or softening material is stored.

The reservoir 38 is located beneath the sink as a rule so that the opening of the vent passage 27 will stop the flow of liquid disinfectant even when the faucet is running.

I have found that by properly proportioning the size of the passages leading from the reservoir 38 to the tapered portion 22 of the bore 10, I can control the amount of the disinfectant mixed with water flowing through the nozzle by adjusting the valves 2 or 3 to give a desired pressure reading on the pressure gage 17. For a given pressure a given amount of the disinfectant is siphoned out of the reservoir 38 and mixed with the water.

In use the valves 2 and 3 are adjusted to give the desired pressure which may be suitably indicated on the dial 18 by a single mark 39. Thereafter the valve 40 secured by the head 29 to the lower end of the stem 30 may be moved downwardly to closed position as shown in Fig. 1 and the siphoning takes place. If it is desired to merely draw plain water without the disinfectant, the valve is opened.

All of the parts which come in contact with the liquid disinfectant are made of hard rubber so that if chlorine or a similar substance is used, corrosion is practically eliminated.

By locating the pressure gage between the valve and the siphon inlet, it is possible to have a constant quantity of water at a constant pressure flowing through the nozzle and since the size of the siphon passages is constant the amount of disinfectant or the like mixed with the water is constant.

In Fig. 4 I show a modified form of the invention. The nozzle 105 which is to be mounted in the same position as the nozzle shown in Fig. 1 has a pressure gage 117 connecting to the passage therethrough so that the operator may control the pressure of the water flowing through the nozzle 105 by adjusting the valves. A casing 140 is provided with a recess 141 to fit over the end 142 of the nozzle and communicate with the outlet 143 thereof as a washer 144 and a bail 145 holds it in place. There is a bore 146 through the casing 140 in which a corrosion resistant member 109 of hard rubber or the like is disposed. A bore 110 extends through the member 109 and flares from inlet to outlet. Intermediate its ends a cross bore 123 which forms the siphon inlet is provided. A cross bore 147 in the casing 140 communicates with the bore 146. It is suitably threaded to receive a screw threaded nipple 126 which has a passage 127 therein. The rubber siphon tube 132 which is suitably connected to a reservoir is fastened on this nipple.

This form of the invention is particularly suited for use on existing equipment and is very simple in construction. The device is used in the manner described above. The valves are set to give the desired pressure which is determined from the gage 117. The user may control the siphoning by pinching the rubber tube 132 or by removing it from the reservoir until the desired pressure is reached. The siphon inlet 123 is of fixed size properly selected to give the desired amount of liquid disinfectant or the like for a given pressure. The operator by setting the valve to give the desired reading on the pressure gage can thus control the amount of the disinfectant or the like for a given quantity of water.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

In an apparatus of the class described, a faucet comprising a casing having an outlet and a second opening therein, a corrosion resistant tubular-like means in said casing and extending from said second opening to a point adjacent said outlet and having a bore therethrough, one end of which opens to said outlet and the other through said second opening, a water inlet in said tubular-like means comprising a cross bore opening into said first mentioned bore, a plug closing the end of said first mentioned bore at said second opening in said casing, a flaring portion in said first mentioned bore between said cross bore and the end adjacent said outlet and flaring toward said outlet, a second cross bore in said corrosion resistant tubular-like means opening into said flaring portion between its ends, a valve adapted to close the outer end of said second cross bore, means including a nipple of corrosion resistant material on said tubular-like means and having a passage intercepting said second mentioned cross bore, a reservoir for liquid disinfectant or the like, and a siphon tube extending from said nipple to said reservoir.

ABSALOM DWIGHT WILLIAMS.